US012347017B2

(12) United States Patent
Noh et al.

(10) Patent No.: US 12,347,017 B2
(45) Date of Patent: Jul. 1, 2025

(54) APPARATUS AND METHOD FOR GENERATING 3D OBJECT TEXTURE MAP, AND RECORDING MEDIUM STORING INSTRUCTIONS TO PERFORM METHOD FOR GENERATING 3D OBJECT TEXTURE MAP

(71) Applicant: Korea Advanced Institute of Science and Technology, Daejeon (KR)

(72) Inventors: Junyong Noh, Daejeon (KR); Sihun Cha, Daejeon (KR); Kwanggyoon Seo, Daejeon (KR); Amirsaman Ashtari, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 136 days.

(21) Appl. No.: 18/170,589

(22) Filed: Feb. 17, 2023

(65) Prior Publication Data
US 2024/0169651 A1   May 23, 2024

(30) Foreign Application Priority Data
Nov. 22, 2022   (KR) .................. 10-2022-0157618

(51) Int. Cl.
*G06T 15/04*   (2011.01)
*G06T 5/50*    (2006.01)
(Continued)

(52) U.S. Cl.
CPC ............... *G06T 15/04* (2013.01); *G06T 5/50* (2013.01); *G06T 7/68* (2017.01); *G06T 11/001* (2013.01);
(Continued)

(58) Field of Classification Search
CPC .. G06T 15/04; G06T 5/50; G06T 7/68; G06T 11/001; G06T 11/60; G06T 2207/20221;
(Continued)

(56) References Cited

U.S. PATENT DOCUMENTS

| 10,679,046 B1* | 6/2020 | Black ................... G06V 40/23 |
| 2018/0260662 A1* | 9/2018 | Clayton ................ G06V 20/58 |

(Continued)

FOREIGN PATENT DOCUMENTS

KR   10-2022-0079673 A   6/2022

OTHER PUBLICATIONS

Sihun Cha et al., "Generating 3D Human Texture from a Single Image with Sampling and Refinement", Korea Computer Graphics Society(KCGS) conference collection of journal of 2022,(Jul. 31, 2022).

*Primary Examiner* — Motilewa Good-Johnson
(74) *Attorney, Agent, or Firm* — NKL Law; Jae Youn Kim

(57) ABSTRACT

There is provided an apparatus for generating a 3D object texture map. The apparatus may comprise: a memory; and a processor, wherein the processor is configured to: generate a partial texture image by mapping object information in an input image into a texture space; obtain a sampling image by inputting the partial texture image to a sampler network trained according to a curriculum for selecting at least one of a training partial texture image, an aligned partial image in which the training partial texture image is aligned in the texture space, or an augmented partial image augmented from the aligned partial image; obtain a blending mask and a refined image by inputting the sampling image to a refiner network; and generate a 3D object texture map by blending the sampling image and the refined image based on the blending mask.

17 Claims, 12 Drawing Sheets

(51) Int. Cl.
   *G06T 7/68*    (2017.01)
   *G06T 11/00*   (2006.01)
   *G06T 11/60*   (2006.01)
   *G06V 10/24*   (2022.01)
   *G06V 10/74*   (2022.01)

(52) U.S. Cl.
   CPC .............. *G06T 11/60* (2013.01); *G06V 10/24* (2022.01); *G06V 10/761* (2022.01); *G06T 2207/20221* (2013.01)

(58) Field of Classification Search
   CPC ... G06T 5/20; G06T 7/30; G06T 2207/20081; G06V 10/24; G06V 10/761; G06V 10/48; G06V 10/764
   See application file for complete search history.

(56) References Cited

U.S. PATENT DOCUMENTS

| | | | |
|---|---|---|---|
| 2019/0311202 A1* | 10/2019 | Lee | G06T 9/002 |
| 2020/0184190 A1* | 6/2020 | Chang Lee | G06V 10/82 |
| 2022/0014723 A1* | 1/2022 | Pandey | G06T 5/60 |
| 2022/0148256 A1* | 5/2022 | Liu | G06N 3/08 |
| 2023/0206609 A1* | 6/2023 | Tsutaoka | A61B 1/000096 |
| | | | 382/159 |
| 2023/0274472 A1* | 8/2023 | Liu | G06N 3/08 |
| | | | 345/582 |
| 2024/0005512 A1* | 1/2024 | Kanakatte Gurumurthy | |
| | | | G06T 7/12 |
| 2024/0096041 A1* | 3/2024 | Xu | G06T 17/00 |
| 2024/0169651 A1* | 5/2024 | Noh | G06T 15/04 |

\* cited by examiner

APPARATUS AND METHOD FOR GENERATING 3D OBJECT TEXTURE MAP, AND RECORDING MEDIUM STORING INSTRUCTIONS TO PERFORM METHOD FOR GENERATING 3D OBJECT TEXTURE MAP

TECHNICAL FIELD

The present disclosure relates to an apparatus and method for generating a 3D object texture map from a single image.

This work was supported by Institute of Information & communications Technology Planning & Evaluation (IITP) grant funded by the Korea government (MSIT) (No.2020-0-00450, A Deep Learning Based Immersive AR Content Creation Platform for Generating Interactive, Context and Geometry Aware Movement from a Single Image).

BACKGROUND

As VR/AR movies, games, and metaverse content industries are attracting attention, research for creating virtual 3D human model to be used as a user's avatar in VR/AR movies, games, and metaverse content is also increasing.

Conventionally, a virtual 3D human model has been created by scanning a whole body or a part of a real person through a scanner. However, if there is a limitation in the use of a scanner or a limitation in the number of provided images, a virtual 3D human model generated by a conventional method inevitably has a low simility with a user. As a method of solving this problem, research on directly creating a virtual 3D human model to be used as a user's avatar from images has recently been actively conducted.

Most of these ongoing studies are focused on reconstruction of the posture and form of the virtual 3D human model but few studies for creating texture that reflects detailed features of a user are less.

SUMMARY

An object of the present disclosure is to provide an apparatus and method for generating a 3D object texture map by blending a sampling image obtained by inputting a partial texture image to a sampler network and a refined image obtained by inputting the sampling image to a refiner network.

However, the object of the present disclosure is not limited to the aforementioned one, and other objects that are not mentioned can be clearly understood by those skilled in the art from the description below.

In accordance with an aspect of the present disclosure, there is provided an apparatus for generating a 3D object texture map, the apparatus may comprise: a memory; and a processor, wherein the processor is configured to: generate a partial texture image by mapping object information in an input image into a texture space; obtain a sampling image by inputting the partial texture image to a sampler network trained according to a curriculum for selecting at least one of a training partial texture image, an aligned partial image in which the training partial texture image is aligned in the texture space, or an augmented partial image augmented from the aligned partial image; obtain a blending mask and a refined image by inputting the sampling image to a refiner network; and generate a 3D object texture map by blending the sampling image and the refined image based on the blending mask.

The sampler network is trained by using the aligned partial image in a first predetermined training interval, the augmented partial image in a second training interval immediately after the first training interval, and the training texture image and the augmented partial image according to a predetermined ratio in a third training interval immediately after the second training interval.

The sampler network is trained using at least one of a first loss function regarding a pixel distance between a first output image and a ground truth image or a second loss function regarding a perceptual distance between the first output image and the ground truth image.

The aligned partial image is obtained by multiplying a pose mask determined based on validity of pixels in the training partial texture image by the ground truth image.

The processor is configured to: generate a first-side texture image by mapping the object information in the input image into the texture space; generate a second-side texture image including symmetry information of the first-side partial texture image; and generate the partial texture image by adding the first-side texture image to the second-side texture image.

The refiner network is trained using at least one of a third loss function regarding a pixel distance between a training sampling image and a second output image, a fourth loss function regarding a feature distance between a texture image and a ground truth image generated from the second output image through a VGG network, a fifth loss function regarding an output result of a discriminator for the second output image and the ground truth image, or a sixth loss function regarding a feature distance between the output result of the discriminator and the ground truth image.

The processor is configured to generate the 3D object texture map by adding a product of the sampling image and the blending mask to a product of the refined image and an inverted blending mask for the blending mask.

In accordance with another aspect of the present disclosure, there is provided a method of generating a 3D object texture map, the method may comprise: generating a partial texture image by mapping object information in an input image into a texture space; obtaining a sampling image by inputting the partial texture image to a sampler network trained according to a curriculum for selecting at least one of a training partial texture image, an aligned partial image in which the training partial texture image is aligned in the texture space, or an augmented partial image augmented from the aligned partial image; obtaining a blending mask and a refined image by inputting the sampling image to a refiner network; and generating a 3D object texture map by blending the sampling image and the refined image based on the blending mask.

The sampler network is generated by training the aligned partial image in a first predetermined training interval, training the augmented partial image in a second training interval immediately after the first training interval, and training the training texture image and the augmented partial image according to a predetermined ratio in a third training interval immediately after the second training interval.

The sampler network is trained using at least one of a first loss function regarding a pixel distance between a first output image and a ground truth image or a second loss function regarding a perceptual distance between the first output image and the ground truth image.

The aligned partial image is obtained by multiplying a pose mask determined based on validity of pixels in the training partial texture image by the ground truth image.

The generating of the partial texture image comprises: generating a first-side texture image by mapping the object information in the input image into the texture space; generating a second-side texture image including symmetry information of the first-side partial texture image; and generating the partial texture image by adding the first-side texture image to the second-side texture image.

The refiner network is trained using at least one of a third loss function regarding a pixel distance between a training sampling image and a second output image, a fourth loss function regarding a feature distance between a texture image and a ground truth image generated from the second output image through a VGG network, a fifth loss function regarding an output result of a discriminator for the second output image and the ground truth image, or a sixth loss function regarding a feature distance between the output result of the discriminator and the ground truth image.

The generating of the 3D object texture map comprises generating the 3D object texture map by adding a product of the sampling image and the blending mask to a product of the refined image and an inverted blending mask for the blending mask.

In accordance with another aspect of the present disclosure, there is provided a non-transitory computer-readable storage medium including computer executable instructions, wherein the instructions, when executed by a processor, cause the processor to perform a method of generating a 3D object texture map. The method comprises: generating a partial texture image by mapping object information in an input image into a texture space; obtaining a sampling image by inputting the partial texture image to a sampler network trained according to a curriculum for selecting at least one of a training partial texture image, an aligned partial image in which the training partial texture image is aligned in the texture space, or an augmented partial image augmented from the aligned partial image; obtaining a blending mask and a refined image by inputting the sampling image to a refiner network; and generating a 3D object texture map by blending the sampling image and the refined image based on the blending mask.

According to one embodiment of the present disclosure, a 3D object texture map can be created from a single image through sampling and refinement. In particular, missing texture may be sampled from detail information of the given object through the sampler network of the present disclosure.

In addition, it is possible to perform alignment in accordance with a UV space of a template mesh simultaneously with sampling.

Furthermore, the quality of a generated texture map can be improved by supplementing the details of a sampled texture image through the refiner network.

DETAILED DESCRIPTION

Figure 1:
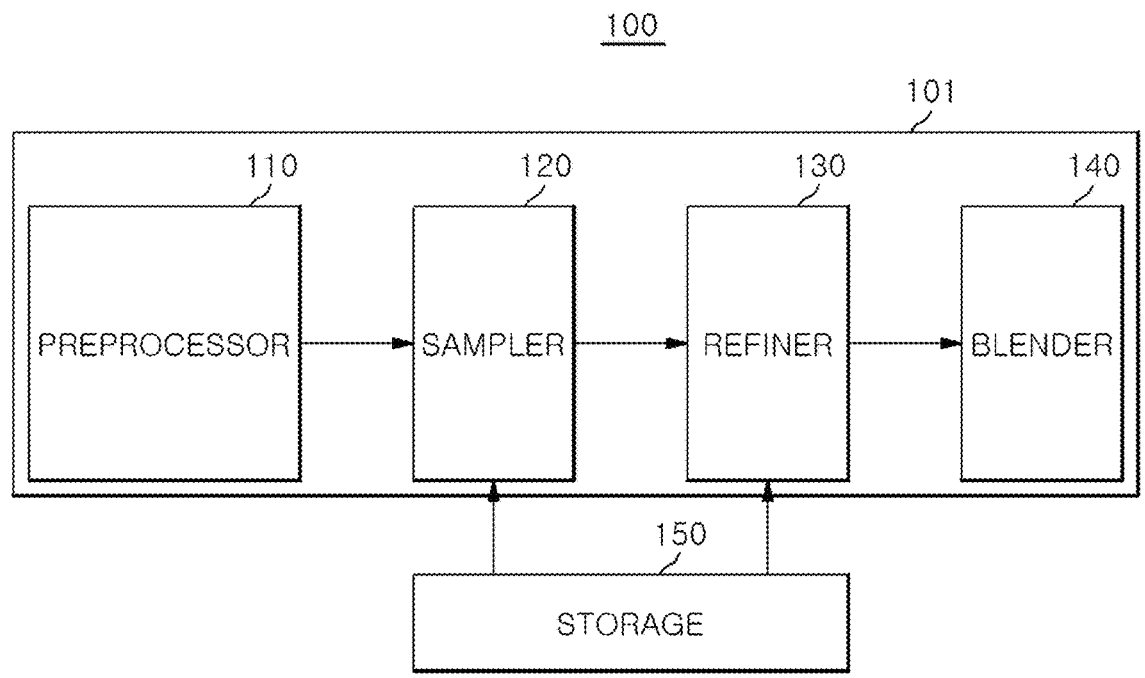
FIG. 1 is a control block diagram of an apparatus for generating a 3D object texture map according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 2:
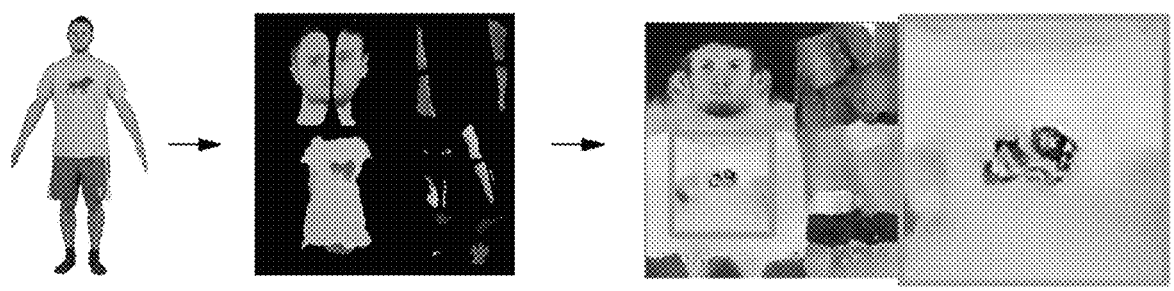
FIG. 2 is a diagram for describing a conventional method of generating a 3D person texture map based on a single image.
Figure 3:
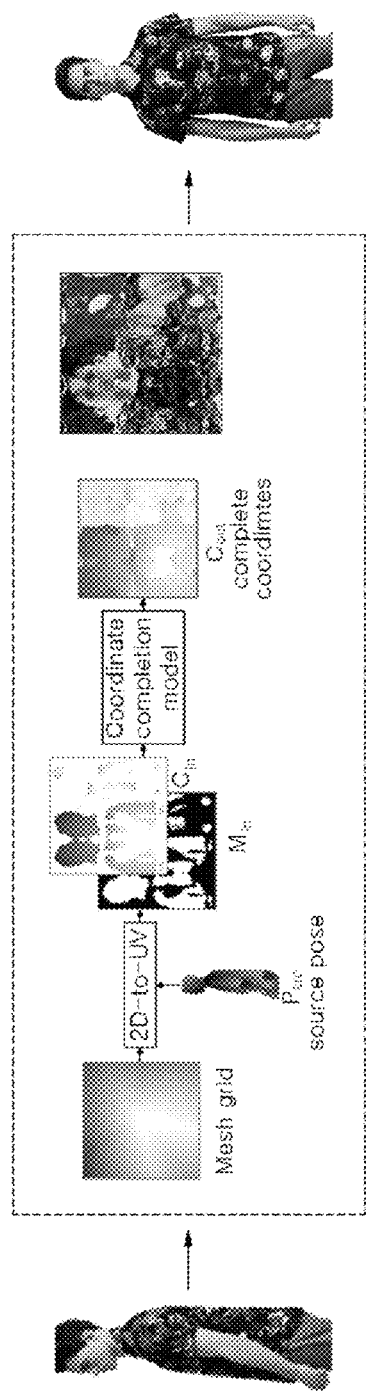
FIG. 3 is a diagram illustrating a conventional image synthesis method using pose information.

FIG. 1 is a control block diagram of an apparatus for generating a 3D object texture map according to an embodiment of the present disclosure, FIG. 2 is a diagram for describing a conventional method of generating a 3D person texture map based on a single image, and FIG. 3 is a diagram illustrating a conventional image synthesis method using pose information.

The apparatus for generating a 3D object texture map according to an embodiment of the present disclosure refers to any apparatus for generating a 3D object texture map for the purpose of texture rendering from a single image in order to enhance the realism of a 3D object model. Here, an object includes all objects that can be 3D modeled, and may include, for example, a person, that is, a human.

A known method of generating a 3D object texture map from a single image is inferring a texture based on a UV space of the SMPL human model. In this case, the SMPL model may refer to a 3D model capable of representing people of various body types.

Referring to FIG. 2, this method can create a complete texture through image-to-image translation after mapping the appearance of a person in an image to the UV space of the SMPL model. Accordingly, it is possible to create a texture with an appropriate level of quality from a global perspective, but there is a likelihood of missing elements in local details of the person in the image.

Another method is a pose-guided image synthesis technique using pose information. This may refer to a method of transforming a person in an input image into a different pose while maintaining the appearance of the person.

In particular, a method of synthesizing an image while effectively maintaining the appearance of a person using a texture map as an intermediate stage has recently been known. Referring to FIG. 3, the method can sample the appearance of a person into a texture space by utilizing pixel coordinates of an input image. Textures sampled in this way can better represent fine details in the input image than textures created through the Image-to-Image Translation method.

However, since a texture map is used for a reference purpose in the intermediate stage, it may be somewhat insufficient for direct use in actual applications due to serious artifacts such as distortion.

To solve this problem, the 3D object texture map generation apparatus 100 of the present disclosure can generate a 3D object texture map by blending a sampling image obtained by inputting a partial texture image to a sampler network and a refined image obtained by inputting the sampling image to a refiner network.

Referring to FIG. 1, the 3D object texture map generation apparatus 100 according to an embodiment of the present disclosure may include a processor 101 and a storage 150. The processor 101 may include a preprocessor 110, a sampler 120, a refiner 130, and a blender 140.

The preprocessor 110 may generate a partial texture image by mapping object information in an input image to a texture space.

The sampler 120 may obtain a sampling image by inputting the partial texture image to a sampler network. Here, the sampler network may be a network trained according to a curriculum for selecting at least one of a training partial texture image, an aligned partial image in which the training partial texture image is aligned in the texture space, or an augmented partial image augmented from the aligned partial image.

The refiner 130 may obtain a blending mask and a refined image by inputting the sampling image to a refiner network. Here, the refiner network may be a network trained by comparing output images with sampling images and/or ground truth images.

The blender 140 may generate a 3D object texture map by blending the sampling image and the refined image based on the blending mask.

The storage 150 may store the sampler network and/or the refiner network in advance and provide them at the requests of the sampler 120 and the refiner 130. Alternatively, a 3D object texture map generation apparatus 100 according to another embodiment of the present disclosure does not include the separate storage unit 150 and may be provided with some or all of the sampler network and the refiner network from an external server or cloud.

Each component of the 3D object texture map generation apparatus 100 according to an embodiment of the present disclosure may be implemented by an arithmetic device including a memory including control software programmed to perform these functions and a microprocessor for executing such software. Here, each component of the 3D object texture map generation apparatus 100 according to the embodiment of FIG. 1 may be independently implemented by a microprocessor, or at least two components may be implemented by one microprocessor.

The configuration of the 3D object texture map generation apparatus 100 according to an embodiment of the present disclosure has been described. Hereinafter, a 3D object texture map generation method performed by the 3D object texture map generation apparatus 100 according to an embodiment of the present disclosure will be described.

Figure 4:
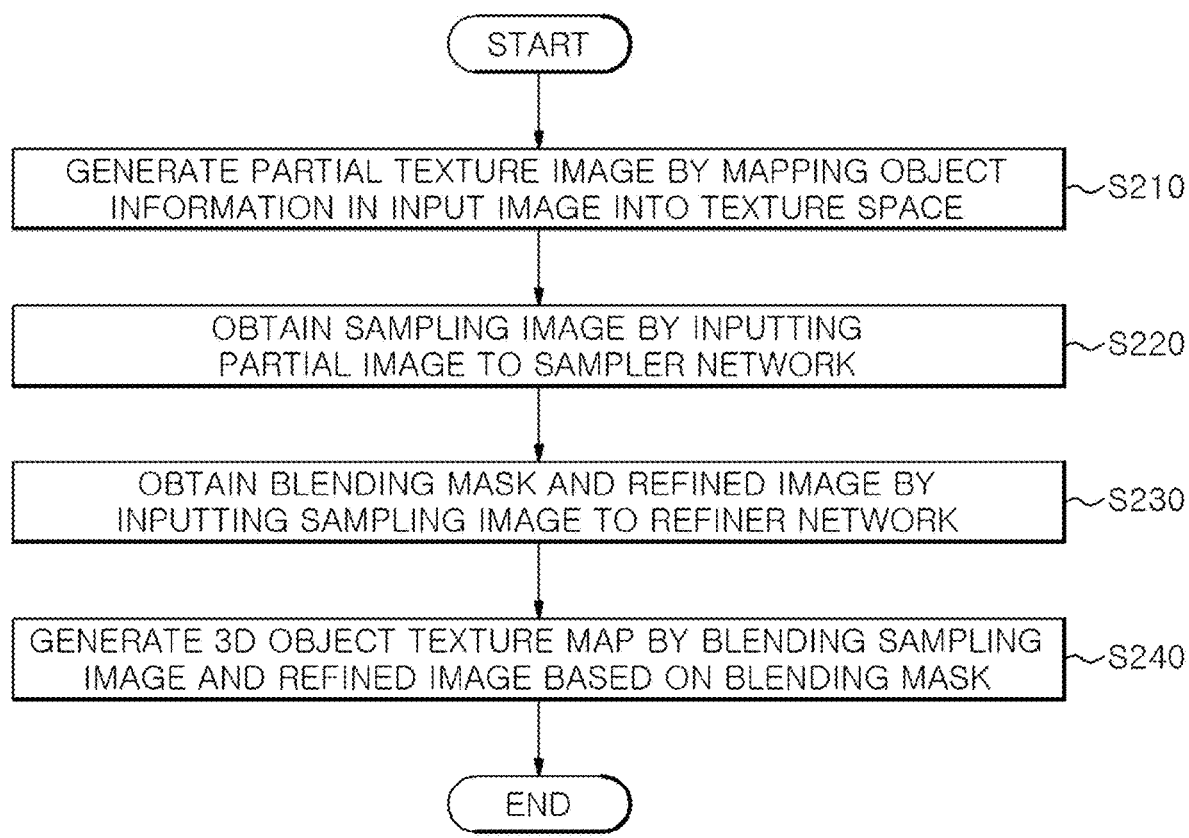
FIG. 4 is a flowchart of a method of generating a 3D object texture map according to an embodiment of the present disclosure.
Figure 5:
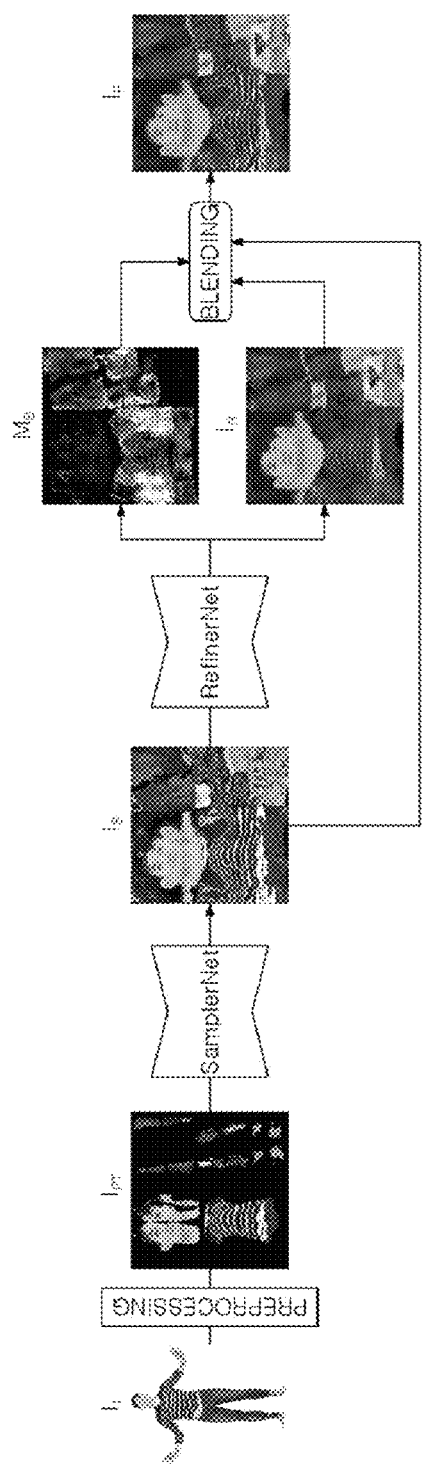
FIG. 5 is a diagram schematically illustrating the method of generating a 3D object texture map according to an embodiment of the present disclosure.
Figure 6:
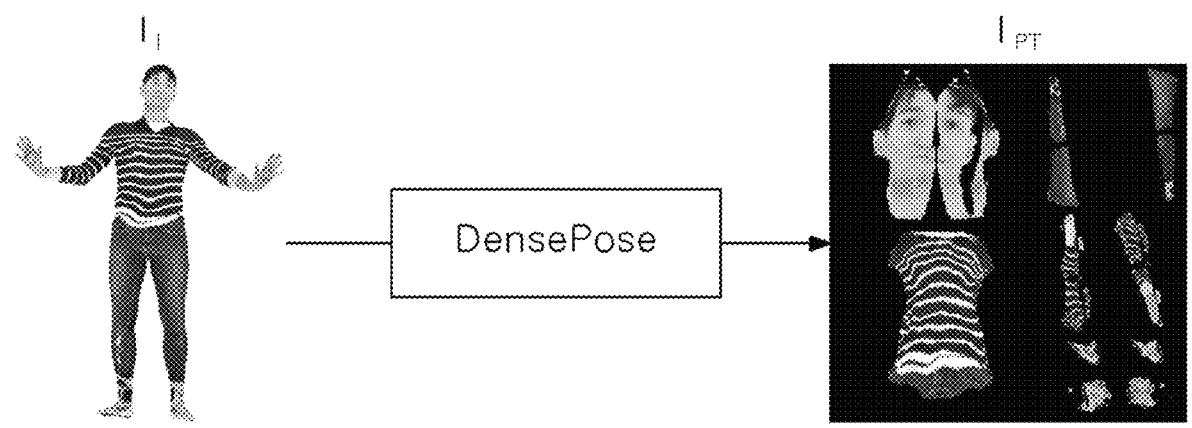
FIG. 6 is a diagram for describing a preprocessing method of a preprocessor according to an embodiment of the present disclosure.
Figure 7:
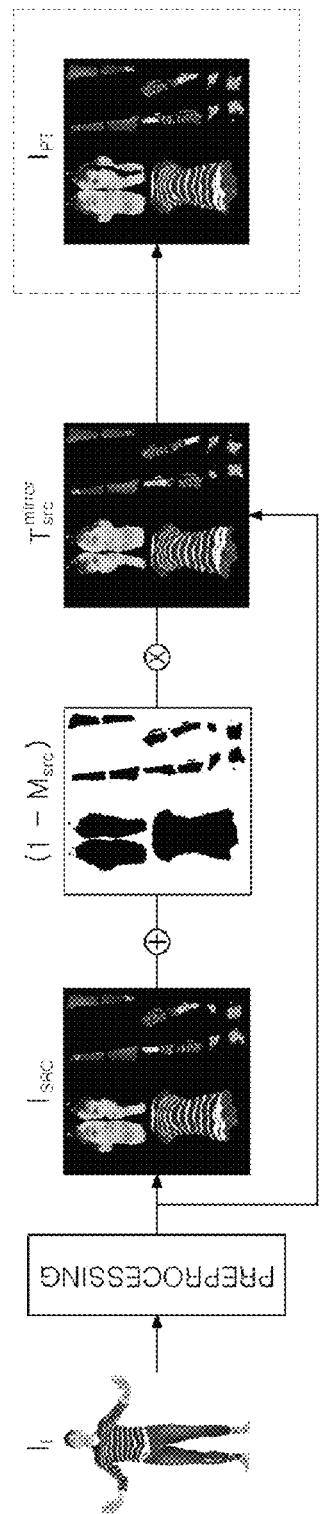
FIG. 7 is a diagram for describing a method of generating a partial texture image including symmetry information by the preprocessor according to an embodiment of the present disclosure.

FIG. 4 is a flowchart of a 3D object texture map generation method according to an embodiment of the present disclosure, FIG. 5 is a diagram schematically illustrating the 3D object texture map generation method according to an embodiment of the present disclosure, FIG. 6 is a diagram for describing a preprocessing method of a preprocessor according to an embodiment of the present disclosure, and FIG. 7 is a diagram for describing a method of generating a partial texture image including symmetry information by a preprocessor according to an embodiment of the present disclosure.

First, the 3D object texture map generation apparatus 100 according to the present disclosure may generate a partial texture image by mapping object information in an input image to a texture space (S210). Referring to FIG. 5, the preprocessor 110 of the 3D object texture map generation apparatus 100 according to an embodiment of the present disclosure may receive an input image $I_I$ and map object information in the image into a UV space of a 3D model, which is a texture space to generate a partial texture image $I_{PT}$. Here, the partial texture image may refer to a texture image generated by mapping information on an object in the input image into the UV space corresponding to the shape/part of the object.

To this end, the preprocessor 110 according to an embodiment of the present disclosure may use DensePose, one of neural networks. DensePose is a network that infers matching points between an object in an input image and an SMPL model, and can output the partial texture image $I_{PT}$ by receiving the input image $I_I$ as shown in FIG. 6. However, since this is merely one embodiment of the preprocessing process performed by the preprocessor 110, the preprocessor 110 may use a different type of neural network, and may perform an operation of mapping object information in the input image into the UV space of the 3D model, which is the texture space, by a method other than a neural network.

In addition, the finally generated partial texture image may include symmetry information. To this end, the preprocessor 110 may generate a partial texture image by combining one partial texture image and the other partial texture image. Specifically, the preprocessor 110 may map object information in the input image into the texture space to generate a first-side texture image, generate a second-side texture image including symmetry information of the first-side partial texture image, and generate the partial texture image by combining the first-side texture image and the second-side texture image.

Referring to FIG. 7, the preprocessor 110 may receive the input image $I_I$ and generate a first-side texture image $I_{SRC}$ through a preprocessing process. Next, the preprocessor 110 may generate a second-side texture image $I_{SRC}^{mirror}$ that is a symmetrical image of the first-side texture image $I_{SRC}$. Finally, the preprocessor 110 may generate the final partial texture image $I_{PT}$ by adding the first-side texture image $I_{SRC}$ to the result of multiplying the second-side texture image $I_{SRC}^{mirror}$ by an inverted mask of $M_{SRC}$, which is a mask of the first-side texture image $I^{SRC}$.

Referring back to FIG. 4, after the partial texture image is generated, the 3D object texture map generation apparatus 100 according to an embodiment of the present disclosure may obtain a sampling image by inputting the partial texture image to the sampler network (S220). Prior to this, the 3D object texture map generation apparatus 100 according to an embodiment of the present disclosure may be provided with the sampler network generated by training in advance.

Hereinafter, a sampler network training method according to an embodiment of the present disclosure will be described with reference to FIGS. 8 to 12.

Figure 8:
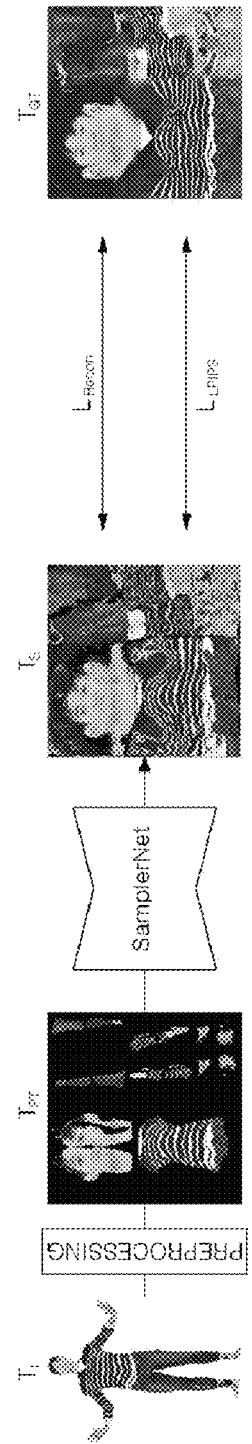
FIG. 8 is a diagram for schematically describing a sampler network training method according to an embodiment of the present disclosure.
Figure 9:
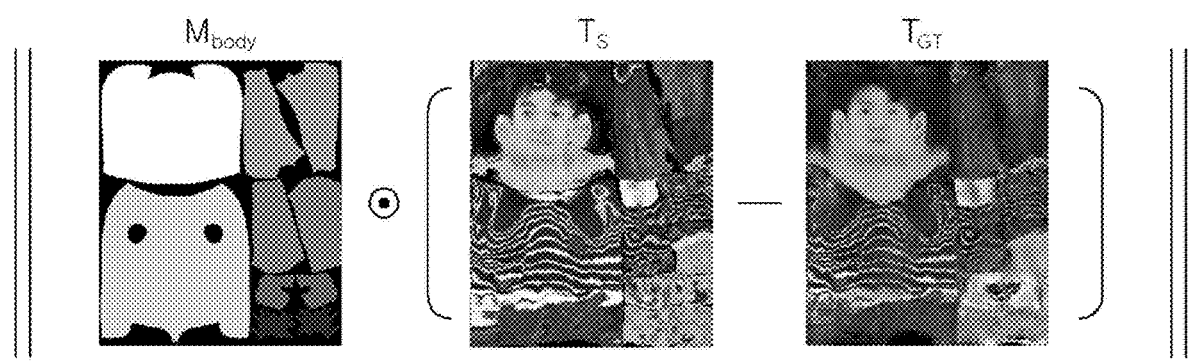
FIG. 9 is a diagram for describing a loss function used for sampler network training according to an embodiment of the present disclosure.
Figure 10:
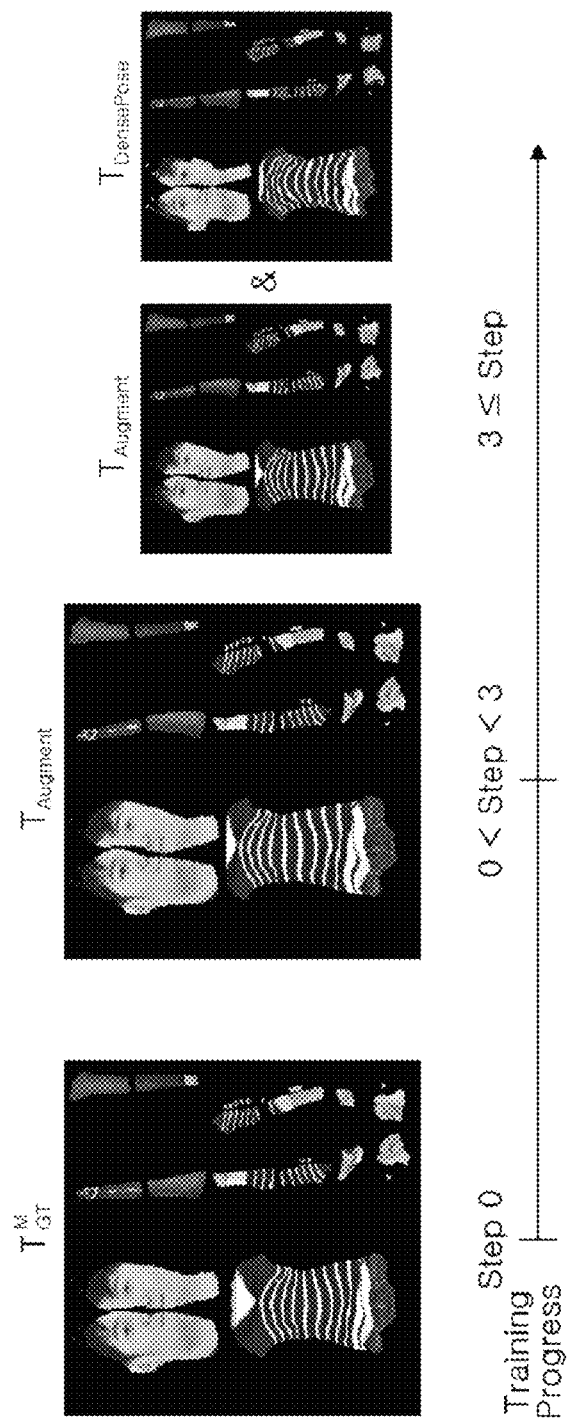
FIG. 10 is a diagram for describing a curriculum training method of a sampler network according to an embodiment of the present disclosure.
Figure 11:
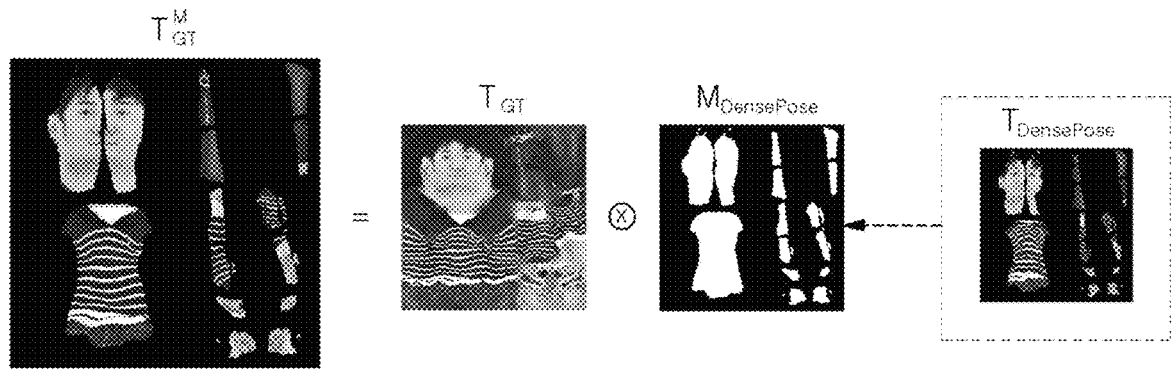
FIG. 11 is a diagram for describing a method of generating an aligned partial image according to an embodiment of the present disclosure.
Figure 12:
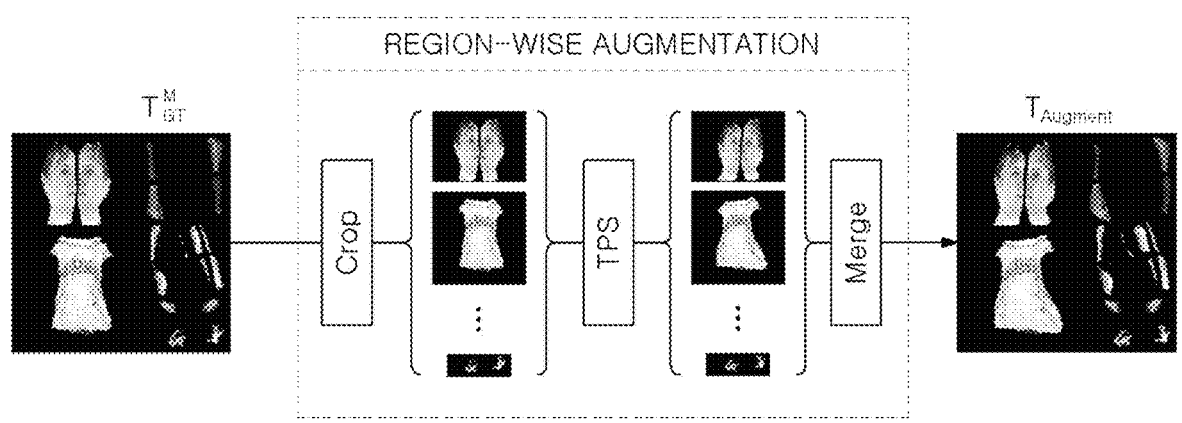
FIG. 12 is a diagram for describing a method of generating an augmented partial image according to an embodiment of the present disclosure.

FIG. 8 is a diagram for schematically describing a sampler network training method according to an embodiment of the present disclosure, FIG. 9 is a diagram for describing a loss function used for sampler network training according to an embodiment of the present disclosure, FIG. 10 is a diagram for describing a curriculum training method of a sampler network according to an embodiment of the present disclosure, FIG. 11 is a diagram for describing a method of generating an aligned partial image according to an embodiment of the present disclosure, and FIG. 12 is a diagram for describing a method of generating an augmented partial image according to an embodiment of the present disclosure.

The sampler network according to an embodiment of the present disclosure is a network in a Unet structured and can be trained based on a first loss function, Reconstruction Loss LRecon, and a second loss function, Perceptual Loss LLPIPS. Specifically, the first loss function can calculate a pixel distance between a first output image $T_S$ and a ground truth image $T_{GT}$ according to Equation 1.

$$\mathcal{L}_{Recon} = \sum_i^N \left\| M_{body}^i \odot (T_{sample} - T_{GT}) \right\|_1 \quad \text{[Equation 1]}$$

Here, $M_{body}^i$ denotes a mask for each part, $T_{sample}$ denotes a sampling image that is the first output image, and $T_{GT}$ denotes a ground truth image. FIG. 9 illustrates Equation 1 in which a difference between the first output image $T_{sample}$ and the ground truth image $T_{GT}$, that is, a pixel distance between the two images, is calculated, and then a pose mask $M_{body}$, which is a mask for each part, is applied to the calculation result.

Further, the second loss function can calculate a perceptual distance between the first output image $T_S$ and the ground truth image $T_{GT}$ according to Equation 2.

$$\mathcal{L}_{LPIPS} = LPIPS(T_{sample}, T_{GT}) \quad \text{[Equation 2]}$$

To this end, the second loss function may use Alexnet, but this may be merely an example.

Finally, the loss function $L_{Sampler}$ of the sampler network according to an embodiment of the present disclosure can be defined as Equation 3.

$$\mathcal{L}_{Sampler} = \lambda_{Recon} \mathcal{L}_{Recon} + \lambda_{LPIPS} \mathcal{L}_{LPIPS} \quad \text{[Equation 3]}$$

When training is performed using the above loss function, the first output function is well aligned in the UV space of SMPL, but details existing in clothes of an object may not be properly reflected. To solve this problem, the sampler network according to an embodiment of the present disclosure may be trained according to a predetermined curriculum.

Here, the curriculum applied to training of the sampler network may mean a training method configured to gradually perform training from a simple training image to a more complex training image as steps progress.

Referring to FIG. 10, the sampler network may learn a simplest training image in step 0, which is the first training interval. The simplest training image means a case where each part of an object in the training image has already been aligned in the UV space, and this may be called an aligned partial image $T_{GT}^M$. Since the aligned partial image $T_{GT}^M$ has already been aligned in the UV space, the sampler network can focus on the operation of sampling only an invisible part.

The aligned partial image $T_{GT}^M$ may be generated according to the process of FIG. 11. Specifically, the aligned partial image $T_{GT}^M$ may be obtained by multiplying a pose mask $M_{DensePose}$ (binary mask generated based on valid pixels and invalid pixels in a training partial texture image $T_{DensePose}$) determined based on validity of pixels in the training partial texture image $T_{DensePose}$ by the ground truth image $T_{GT}$.

Referring back to FIG. 10, the sampler network may learn an augmented partial image $T_{Augment}$ in a second training interval (e.g., 0<step<3). Here, the augmented partial image $T_{Augment}$ may be generated by applying region-wise augmentation to the aligned partial image $T_{GTM}$, and the region-wise augmentation may mean a method for approximating augmentation of Denspose.

FIG. 12 illustrates an example of region-wise augmentation. First, the aligned partial image $T_{GT}^M$ is cropped for each part, Thin-Plate-Spline Transform is applied to cropped images, and then the images are combined into one image to finally generate the augmented partial image $T_{Augment}$.

Referring back to FIG. 10, the sampler network may perform training using both the augmented partial image $T_{Augment}$ and the training partial texture image $T_{DensePose}$ in a third training interval (e.g., 3≤step). The ratio of the two images can be modified, and according to an embodiment of the present disclosure, the sampler network may perform training by setting the ratio of the augmented partial image $T_{Augment}$ and the training partial texture image $T_{DensePose}$ to 5:5.

When the sampler network generated through the above-described training is provided, the 3D object texture map generation apparatus 100 according to an embodiment of the present disclosure may obtain a sampling image by inputting the partial texture image to the sampler network. Referring to FIG. 5, it can be confirmed that the sampler network outputs a sampling image $I_S$ when the partial texture image $I_{PT}$ is input.

Referring back to FIG. 4, after obtaining the sampling image, the 3D object texture map generation apparatus 100 according to an embodiment of the present disclosure may obtain a blending mask and a refined image by inputting the sampling image to a refiner network (S230). Prior to this, the 3D object texture map generation apparatus 100 according to an embodiment of the present disclosure may be provided with a refiner network generated by training in advance.

Hereinafter, a refiner network training method according to an embodiment of the present disclosure will be described with reference to FIGS. 13 and 14.

Figure 13:
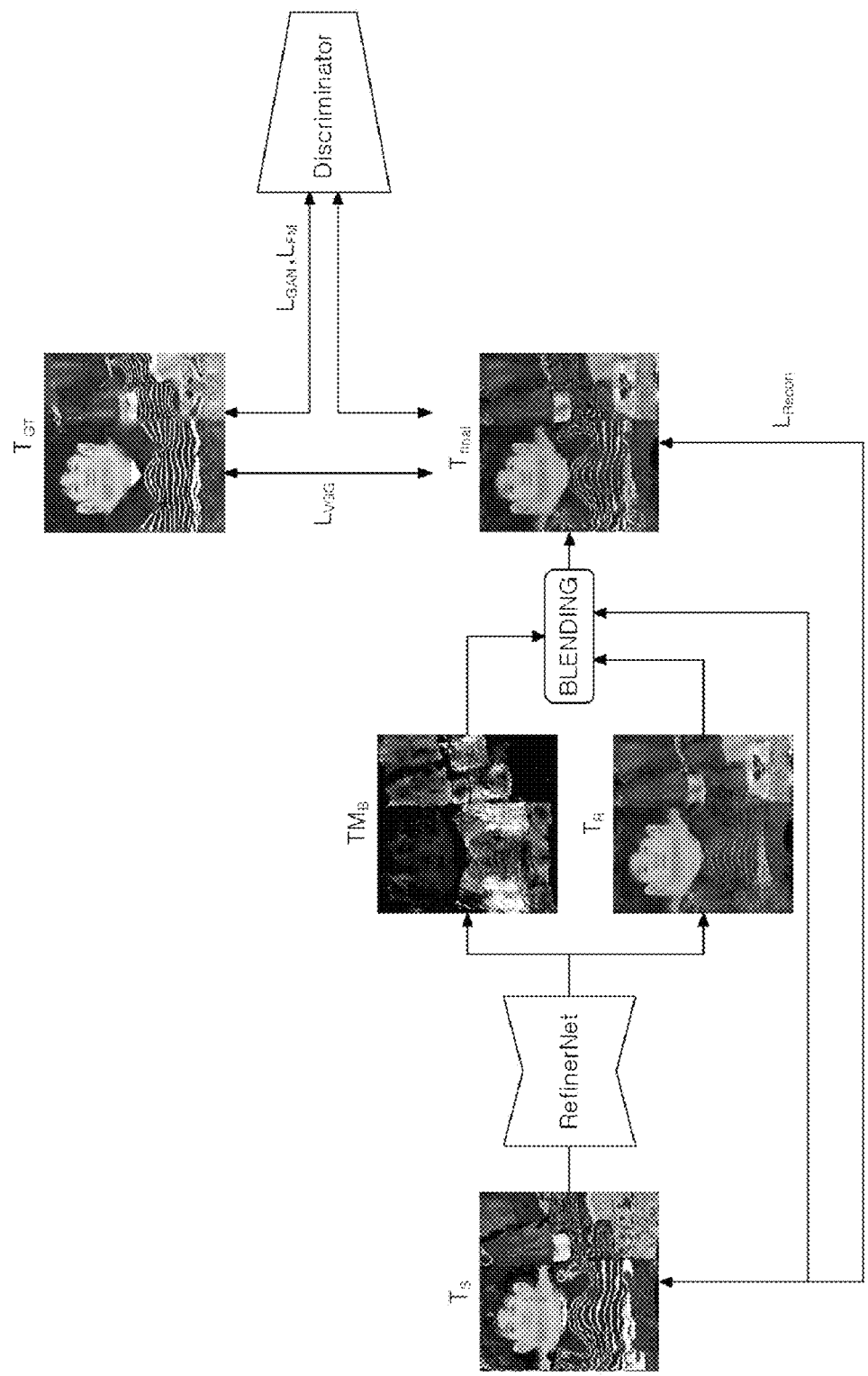
FIG. 13 is a diagram for schematically describing a refiner network training method according to an embodiment of the present disclosure.
Figure 14:
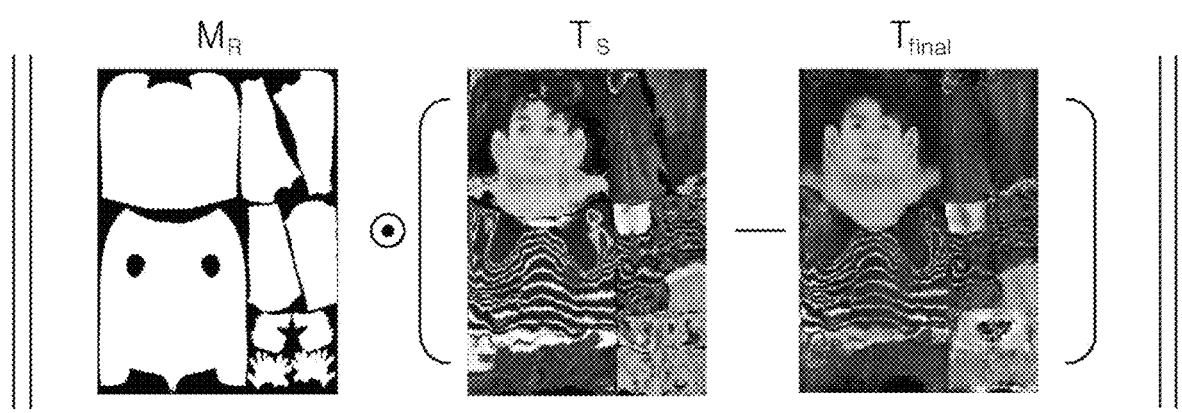
FIG. 14 is a diagram for describing a loss function used for refiner network training according to an embodiment of the present disclosure.

FIG. 13 is a diagram schematically illustrating a refiner network training method according to an embodiment of the present disclosure and FIG. 14 is a diagram for describing a loss function used for refiner network training according to an embodiment of the present disclosure.

The refiner network according to an embodiment of the present disclosure may also have a network in the Unet structure like the sampler network and may perform training based on third to sixth loss functions. Specifically, the third loss function, Reconstruction Loss LRecon, can calculate a pixel value distance between a training sampling image $T_S$ and a second output image $T_{final}$ according to Equation 4.

$$\mathcal{L}_{Recon} = \Sigma \| M_{uv} \odot (T_{sample} - T_{final}) \|_1 \quad \text{[Equation 4]}$$

Here, $M_{uv}$ denotes a binary mask regarding the presence or absence of a point mapped to the surface of SMPL in the UV space. FIG. 14 shows Equation 4 in which a difference between the training sampling image $T_s$ and the second output image $T_{final}$, that is, a pixel distance between the two images, is calculated, and then the mask $M_{uv}$ is applied to the calculation result.

In this case, it is possible to cope with a plurality of texture images corresponding to the input image by comparing the training sampling image $T_s$ instead of the ground truth image $T_{GT}$ with the second output image $T_{final}$. For example, the same pattern as the front surface has been sampled on the back of the body in the training sampling image $T_s$, but there may be no pattern on the back in the actual ground truth image $T_{GT}$. In this case, when the ground truth image $T_{GT}$ is directly compared with the second output image $T_{final}$, the refiner network performs training in a manner of ignoring details sampled by the sampler network during the training process, which may result in outputting a blurry texture image.

In addition, the fourth loss function, VGG Loss LVGG, can calculate a feature distance between a texture image and a ground truth image $T_{GT}$ generated from the second output image $T_{final}$ through a VGG network according to Equation 5.

$$\mathcal{L}_{VGG} = \sum_i^N \frac{1}{w_i} \| \phi_{l_i}(T_{GT}) - \phi_{l_i}(T_{final}) \|_1, \quad \text{[Equation 5]}$$

$\phi_l : l^{th}$ Layer of VGG19

Here, Φ denotes a VGG-19 network.

In addition, the fifth loss function, GAN Loss LGAN, can obtain an output result of a discriminator for the second output image $T_{final}$ and the ground truth image $T_{GT}$ according to Equation 6.

$$\mathcal{L}_{GAN} = \mathbb{E}_{T_{GT}}[\log D(T_{GT})] + \mathbb{E}_{r_{final}}[\log(1 - D(T_{final}))] \quad \text{[Equation 6]}$$

Here, D denotes a patch discriminator.

The fifth loss function according to an embodiment of the present disclosure may be implemented as Adversarial Loss, but this may be merely an example.

In addition, the sixth loss function, Feature Matching Loss LFM, can calculate a feature distance between the output result of the discriminator and the ground truth image $T_{GT}$ according to Equation 7.

$$\mathcal{L}_{FM} = \sum_{i=1}^{N} \| D_{l_i}(T_{GT}) - D_{l_i}(T_{final}) \|_1, \quad \text{[Equation 7]}$$

$D_l : l^{th}$ Layer of discriminator

Here, D denotes a patch discriminator.

When the refiner network generated through the above-described training is provided, the 3D object texture map generation apparatus 100 according to an embodiment of the present disclosure may obtain a blending mask and a refined image by inputting the sampling image to the refiner network. Referring to FIG. 5, it can be confirmed that the refiner network outputs a blending mask $M_S$ and a refined image $I_R$ when the sampling image $I_S$ is input.

Since the quality of the sampling image generated by the sampler network may vary depending on the pose or angle of the object in the input image, it can be minimized by providing the refiner network. For example, if the face of an object is occluded at an extreme angle, the sampler network may not be able to sample essential details of the object, the face. In this case, the refiner network can generate missing details based on a sampling image.

Referring back to FIG. 4, finally, the blender 140 of the 3D object texture map generation apparatus 100 according to an embodiment of the present disclosure blends the sampling image and the refined image based on the blending mask to generate a 3D object texture map (S240). Hereinafter, the operation of the blender 140 according to an embodiment of the present disclosure will be described with reference to FIG. 15.

Figure 15:
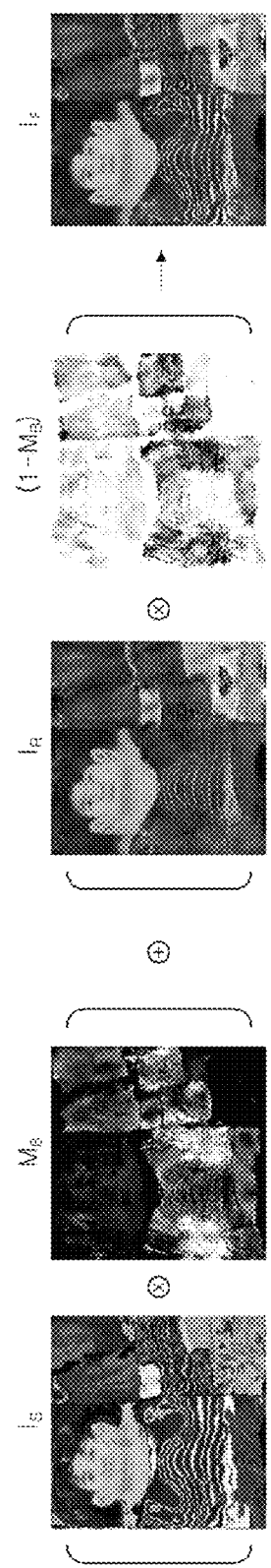
FIG. 15 is a diagram for describing an operation of a blender according to an embodiment of the present disclosure.

FIG. 15 is a diagram for describing the operation of the blender according to an embodiment of the present disclosure.

Referring to FIG. 15, the blender may generate a 3D object texture map by adding the product of the sampling image $I_S$ and the blending mask $M_B$ to the product of the refined image $I_R$ and the inverted blending mask $1-M_B$ for the blending mask $M_B$.

As described above, according to an embodiment of the present disclosure, a 3D object texture map can be generated from a single image through sampling and refinement. In particular, textures missing from detail information of a given object can be sampled through the sampler network of the present disclosure. In addition, it is possible to perform alignment in accordance with the UV space of a template mesh simultaneously with sampling. Furthermore, the quality of the generated texture map can be improved by the refiner network supplementing details of a sampled texture image.

Meanwhile, each step included in the 3D object texture map generation method according to the above-described embodiment may be implemented in a computer-readable recording medium recording a computer program programmed to perform these steps.

In addition, each step included in the 3D object texture map generation method according to the above-described embodiment may be implemented as a computer program programmed to perform these steps.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A 3D object texture map generation apparatus, comprising:
a memory; and
a processor,
wherein the processor is configured to:
generate a partial texture image by mapping object information in an input image into a texture space;
obtain a sampling image by inputting the partial texture image to a sampler network trained according to a training partial texture image, an aligned partial image in which the training partial texture image is aligned in the texture space, and an augmented partial image augmented from the aligned partial image;
obtain a blending mask and a refined image by inputting the sampling image to a refiner network; and
generate a 3D object texture map by blending the sampling image and the refined image based on the blending mask, and
wherein the sampler network is trained by using the aligned partial image in a first predetermined training interval, using the augmented partial image in a second training interval immediately after the first training interval, and using the training partial texture image and the augmented partial image according to a predetermined ratio in a third training interval immediately after the second training interval.

2. The apparatus of claim 1, wherein the sampler network is trained using:
a first loss function regarding a pixel distance between a first output image and a ground truth image according to the following equation:

$$\mathcal{L}_{Recon} = \sum_{i}^{N} \left\| M_{body}^i \odot (T_{sample} - T_{GT}) \right\|_1 \quad \text{[Equation 1]}$$

wherein $L_{Recon}$ is the first loss function, $M_{body}^i$ denotes a mask for each part of an object, $T_{sample}$ denotes a sampling image that is the first output image, and $T_{GT}$ denotes the ground truth image,
and
a second loss function regarding a perceptual distance between the first output image and the ground truth image,
wherein the first output image is output from the sampler network, and
wherein the ground truth image is pre-prepared for training and includes a correct answer for the training the sampler network.

3. The apparatus of claim 1, wherein the aligned partial image is obtained by multiplying a pose mask determined based on validity of pixels in the training partial texture image by the ground truth image.

4. The apparatus of claim 1, wherein the processor is configured to:
generate a first-side texture image by mapping the object information in the input image into the texture space;
generate a second-side texture image including symmetry information of the first-side partial texture image; and generate the partial texture image by adding the first-side texture image to the second-side texture image.

5. The apparatus of claim 1, wherein the refiner network is trained using a third loss function regarding a pixel distance between a training sampling image and a second output image, a fourth loss function regarding a feature distance between a texture image generated from the second output image through a VGG network and a ground truth image, a fifth loss function regarding an output result of a discriminator for the second output image and the ground truth image, and a sixth loss function regarding a feature distance between the output result of the discriminator and the ground truth image.

6. The apparatus of claim 1, wherein the processor is configured to generate the 3D object texture map by adding a product of the sampling image and the blending mask to a product of the refined image and an inverted blending mask for the blending mask.

7. A method of generating a 3D object texture map using a 3D object texture map generation apparatus including a memory and a processor, comprising:
generating a partial texture image by mapping object information in an input image into a texture space;
obtaining a sampling image by inputting the partial texture image to a sampler network trained according to a training partial texture image, an aligned partial image in which the training partial texture image is aligned in the texture space, and an augmented partial image augmented from the aligned partial image;
obtaining a blending mask and a refined image by inputting the sampling image to a refiner network; and
generating a 3D object texture map by blending the sampling image and the refined image based on the blending mask, and
wherein the sampler network is trained by using the aligned partial image in a first predetermined training interval, using the augmented partial image in a second training interval immediately after the first training interval, and using the training partial texture image and the augmented partial image according to a predetermined ratio in a third training interval immediately after the second training interval.

8. The method of claim 7, wherein the sampler network is trained using
a first loss function regarding a pixel distance between a first output image and a ground truth image according to the following equation:

$$\mathcal{L}_{Recon} = \sum_{i}^{N} \left\| M_{body}^{i} \odot (T_{sample} - T_{GT}) \right\|_{1} \quad \text{[Equation 1]}$$

wherein $L_{Recon}$ is the first loss function, $M_{body}^{i}$ denotes a mask for each part of an object, $T_{sample}$ denotes a sampling image that is the first output image, and $T_{GT}$ denotes the ground truth image, and
a second loss function regarding a perceptual distance between the first output image and the ground truth image,
wherein the first output image is output from the sampler network, and
wherein the ground truth image is pre-prepared for training and includes a correct answer for the training the sampler network.

9. The method of claim 7, wherein the aligned partial image is obtained by multiplying a pose mask determined based on validity of pixels in the training partial texture image by the ground truth image.

10. The method of claim 7, wherein the generating of the partial texture image comprises:
generating a first-side texture image by mapping the object information in the input image into the texture space;
generating a second-side texture image including symmetry information of the first-side partial texture image; and
generating the partial texture image by adding the first-side texture image to the second-side texture image.

11. The method of claim 7, wherein the refiner network is trained using a third loss function regarding a pixel distance between a training sampling image and a second output image, a fourth loss function regarding a feature distance between a texture image generated from the second output image through a VGG network and a ground truth image, a fifth loss function regarding an output result of a discriminator for the second output image and the ground truth image, and a sixth loss function regarding a feature distance between the output result of the discriminator and the ground truth image.

12. The method of claim 7, wherein the generating of the 3D object texture map comprises generating the 3D object texture map by adding a product of the sampling image and the blending mask to a product of the refined image and an inverted blending mask for the blending mask.

13. A non-transitory computer-readable storage medium including computer executable instructions, wherein the instructions, when executed by a processor, cause the processor to perform a method of generating a 3D object texture map, the method comprising:
generating a partial texture image by mapping object information in an input image into a texture space;
obtaining a sampling image by inputting the partial texture image to a sampler network trained according to a training partial texture image, an aligned partial image in which the training partial texture image is aligned in the texture space, and an augmented partial image augmented from the aligned partial image;
obtaining a blending mask and a refined image by inputting the sampling image to a refiner network; and
generating a 3D object texture map by blending the sampling image and the refined image based on the blending mask, and
wherein the sampler network is generated by training the aligned partial image in a first predetermined training interval, training the augmented partial image in a second training interval immediately after the first training interval, and training the training partial texture image and the augmented partial image according to a predetermined ratio in a third training interval immediately after the second training interval.

14. The non-transitory computer-readable storage medium of claim 13, wherein the sampler network is trained using
a first loss function regarding a pixel distance between a first output image and a ground truth image according to the following equation:

$$\mathcal{L}_{Recon} = \sum_{i}^{N} \left\| M_{body}^{i} \odot (T_{sample} - T_{GT}) \right\|_{1} \quad \text{[Equation 1]}$$

wherein $L_{Recon}$ is the first loss function, $M_{body}^{i}$ denotes a mask for each part of an object, $T_{sample}$ denotes a sampling image that is the first output image, and $T_{GT}$ denotes the ground truth image,
and a second loss function regarding a perceptual distance between the first output image and the ground truth image, wherein the first output image is output from the sampler network, and wherein the ground truth image is pre-prepared for training and includes a correct answer for the training the sampler network.

15. The non-transitory computer-readable storage medium of claim 13, wherein the aligned partial image is obtained by multiplying a pose mask determined based on validity of pixels in the training partial texture image by the ground truth image.

16. The non-transitory computer-readable storage medium of claim 13, wherein the generating of the partial texture image comprises:

generating a first-side texture image by mapping the object information in the input image into the texture space;

generating a second-side texture image including symmetry information of the first-side partial texture image; and generating the partial texture image by adding the first-side texture image to the second-side texture image.

17. The non-transitory computer-readable storage medium of claim 13, wherein the refiner network is trained using a third loss function regarding a pixel distance between a training sampling image and a second output image, a fourth loss function regarding a feature distance between a texture image generated from the second output image through a VGG network and a ground truth image, a fifth loss function regarding an output result of a discriminator for the second output image and the ground truth image, and a sixth loss function regarding a feature distance between the output result of the discriminator and the ground truth image.

* * * * *